(12) United States Patent
Stafford et al.

(10) Patent No.: US 6,776,736 B1
(45) Date of Patent: Aug. 17, 2004

(54) SELF-REGULATING REVERSE BOOST VALVE ASSEMBLY

(75) Inventors: Maura Jane Stafford, Warner Robins, GA (US); Scott C. Jackson, Chester, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 14 days.

(21) Appl. No.: 10/321,013

(22) Filed: Dec. 18, 2002

Related U.S. Application Data (60) Provisional application No. 60/347,027, filed on Jan. 10, 2002.

(51) Int. Cl.[7] .................... F16H 31/00; F16H 61/26; E03B 1/00
(52) U.S. Cl. .................. 475/127; 477/127; 137/625.66
(58) Field of Search .................. 475/127; 477/127–128

(56) References Cited

U.S. PATENT DOCUMENTS

| | | | | |
|---|---|---|---|---|
| 5,399,130 A | * | 3/1995 | Long ........................ 477/130 |
| 5,743,823 A | * | 4/1998 | Younger ..................... 475/120 |
| 6,022,085 A | * | 2/2000 | Ganzel et al. ............... 137/112 |
| 6,099,429 A | * | 8/2000 | Younger ..................... 475/120 |
| 6,485,388 B2 | * | 11/2002 | Kim et al. .................. 475/127 |
| 6,619,323 B1 | * | 9/2003 | Stafford ................. 137/625.69 |
| 6,712,726 B1 | * | 3/2004 | Jackson et al. ............. 475/127 |

* cited by examiner

Primary Examiner—Roger Pang
(74) Attorney, Agent, or Firm—Clifford F. Rey

(57) ABSTRACT

A self-regulating reverse boost valve assembly for installation within the hydraulic pump of an automatic transmission is disclosed. The present reverse boost valve assembly operates in conjunction with the pressure regulator valve to control line pressure generated by the hydraulic pump boosting line pressure in relation to engine torque. The present reverse boost valve assembly includes an internal check valve mechanism that is actuated whenever torque signal fluid pressure (proportional to engine torque) exceeds a predetermined level. When the internal check valve mechanism is actuated, the excess torque signal fluid pressure is diverted via an internal exhaust channel to the transmission sump. Thus, any drastic rise in main line hydraulic pressure or high line pressure in reverse gear, which can result in broken direct clutch drums and/or broken transmission cases, is prevented.

17 Claims, 7 Drawing Sheets

SELF-REGULATING REVERSE BOOST VALVE ASSEMBLY

CROSS-REFERENCE TO RELATED APPLICATION

This application claims the benefit under 35 U.S.C. 119(e) of U.S. Provisional Patent Application No. 60/347,027 filed Jan. 10, 2002 entitled Self-Regulating Reverse Boost Valve.

BACKGROUND OF INVENTION

The present invention relates generally to the field of hydraulic circuits utilized in automatic transmission systems and, more particularly, to a Self-Regulating Reverse Boost Valve for use in General Motors 4L80E transmissions.

Automatic transmission systems of the prior art have a hydraulic circuit sub-system, which includes at least a hydraulic pump, a valve body having fluid conducting passages or circuits, input and exhaust ports formed within the fluid circuits, and a plurality of spool valves so-called because of their resemblance to sewing-thread type spools. Such valves are comprised of generally cylindrical pistons having control diameters or lands formed thereon, which alternately open and close the ports to the fluid circuits to regulate the flow and pressure of automatic transmission fluid (hereinafter "ATF") in order to actuate different components of the transmission. It will be understood that in describing hydraulic circuits, ATF usually changes names when it passes through an orifice or control valve in a specific fluid circuit.

In the General Motors (hereinafter "GM") 4L80E transmission the Reverse Boost Valve is activated by Torque Signal (hereinafter "TS") fluid pressure from the Variable Force motor and operates against the force of the Pressure Regulator valve spring. Such TS fluid pressure induced movement forces the Pressure Regulator valve to move against ATF supply from the hydraulic pump thereby boosting line pressure in relation to engine torque. When Reverse gear range is selected, reverse fluid pressure also forces the Reverse Boost valve to move toward the Pressure Regulator valve to boost line pressure.

Common service problems in the GM 4L80E transmission are an uncontrollable rise in main line hydraulic pressure (i.e. upwards of 500–600 psi), high line pressure in Reverse gear, broken direct clutch drums, and/or broken cases, which result from excessive Torque Signal pressure leaking past the original equipment manufacture (hereinafter "OEM") Boost Valve and into the Reverse fluid circuit. Thus, the present invention has been developed to resolve this problem and other shortcomings of the prior art.

SUMMARY OF THE INVENTION

Accordingly, the present invention is a Self-Regulating Reverse Boost Valve Assembly for an automatic transmission such as the GM 4L80E transmission including an internal check valve mechanism that is actuated whenever Torque Signal pressure to the present Reverse Boost Valve Assembly exceeds a predetermined level (i.e. 95–100 psi). The excess ATF pressure is diverted to fluid exhaust circuits via an internal fluid channel formed in the present valve to the transmission sump. In this manner excessive main line pressure, excessive line pressure in Reverse gear, broken direct clutch drums, and/or damaged transmission cases are avoided.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Prior to describing the present invention in detail it may be beneficial to briefly review the structure and function of the prior art Reverse Boost Valve and the Pressure Regulator Valve of the GM 4L80E transmission. It will be noted that the following disclosure is directed primarily to the GM 4L80E transmission for purposes of explanation. However, it will be understood that the present inventive concept is applicable to hydraulic valves of other manufacturers having a similar configuration and function and, thus, are considered to be within the scope of the present invention.

Figure 1:
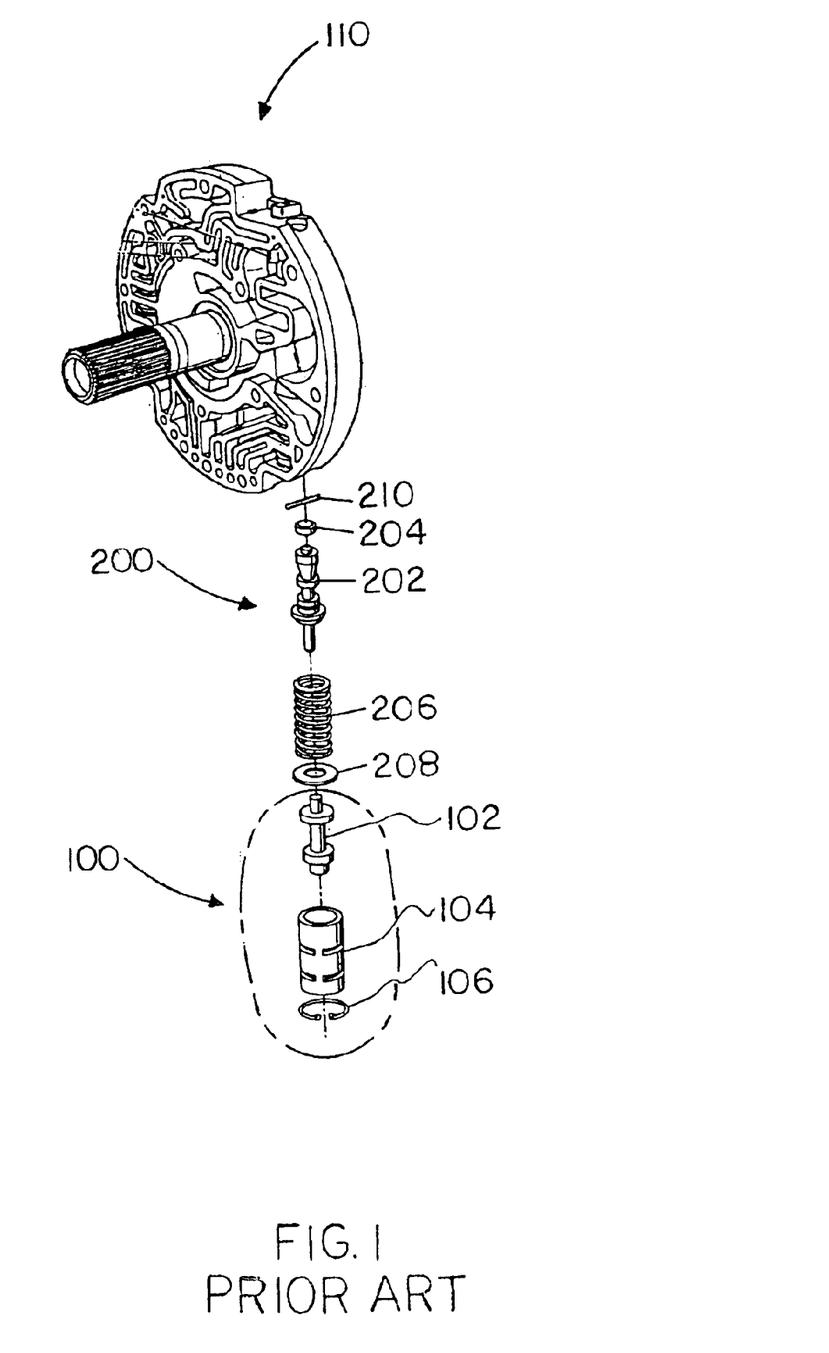
FIG. 1 is a perspective view of the oil pump of the GM 4L80E transmission labeled Prior Art and showing the components of the OEM Reverse Boost Valve and Pressure Regulator Valve in exploded view.

With reference to the drawings there is shown therein a Reverse Boost Valve, indicated generally at 100, and a Pressure Regulator Valve, indicated generally at 200, in accordance with the prior art and illustrated in FIG. 1. The OEM Reverse Boost Valve 100 and the Pressure Regulator Valve 200 are shown in exploded view and removed from their functional positions within the hydraulic pump, indicated generally at 110, of the GM 4L80E transmission.

In the prior art the Reverse Boost Valve 100 comprises a valve piston 102, which is disposed within a valve sleeve 104. A retaining ring 106 secures the sleeve 104 in its functional position within a mating bore (not shown) formed in the body of the pump 110. It can be seen that the Reverse Boost Valve 100 is arranged coaxially in end-to-end relation with the Pressure Regulator Valve 200, which is comprised of a valve piston 202, a regulator plug 204, compression spring 206, isolator spring 207 (FIG. 3), a retaining washer 208, and a retaining pin 210. It will be understood that the Reverse Boost Valve 100 acts in conjunction with the Pressure Regulator Valve 200 to regulate line pressure within their respective hydraulic circuits.

In operation the OEM Reverse Boost Valve 100 responds to TS fluid pressure routed from the Variable Force Motor (not shown). The Variable Force Motor is a precision electronic pressure regulation device controlled by the Powertrain Control Module (PCM). Torque Signal fluid pressure is generally proportional to engine torque and strokes the Reverse Boost Valve 100 against the compression spring 206, which in turn exerts the force of the TS fluid pressure to the Pressure Regulator Valve 200 to increase line pressure. The Reverse Boost Valve 100 is also responsive to reverse fluid pressure and functions to increase line pressure when Reverse gear range is selected.

A common problem arises due to wear of the Reverse Boost valve sleeve 104, which causes leakage between the Reverse Boost/Torque Signal circuits. Such leakage can cause uncontrollable line rise (i.e. upwards of 500–600 psi), high line pressure, broken direct clutch drums and pistons, and/or damaged transmission cases. Thus, the present invention has been developed to resolve these problems and will now be described.

Figure 2:
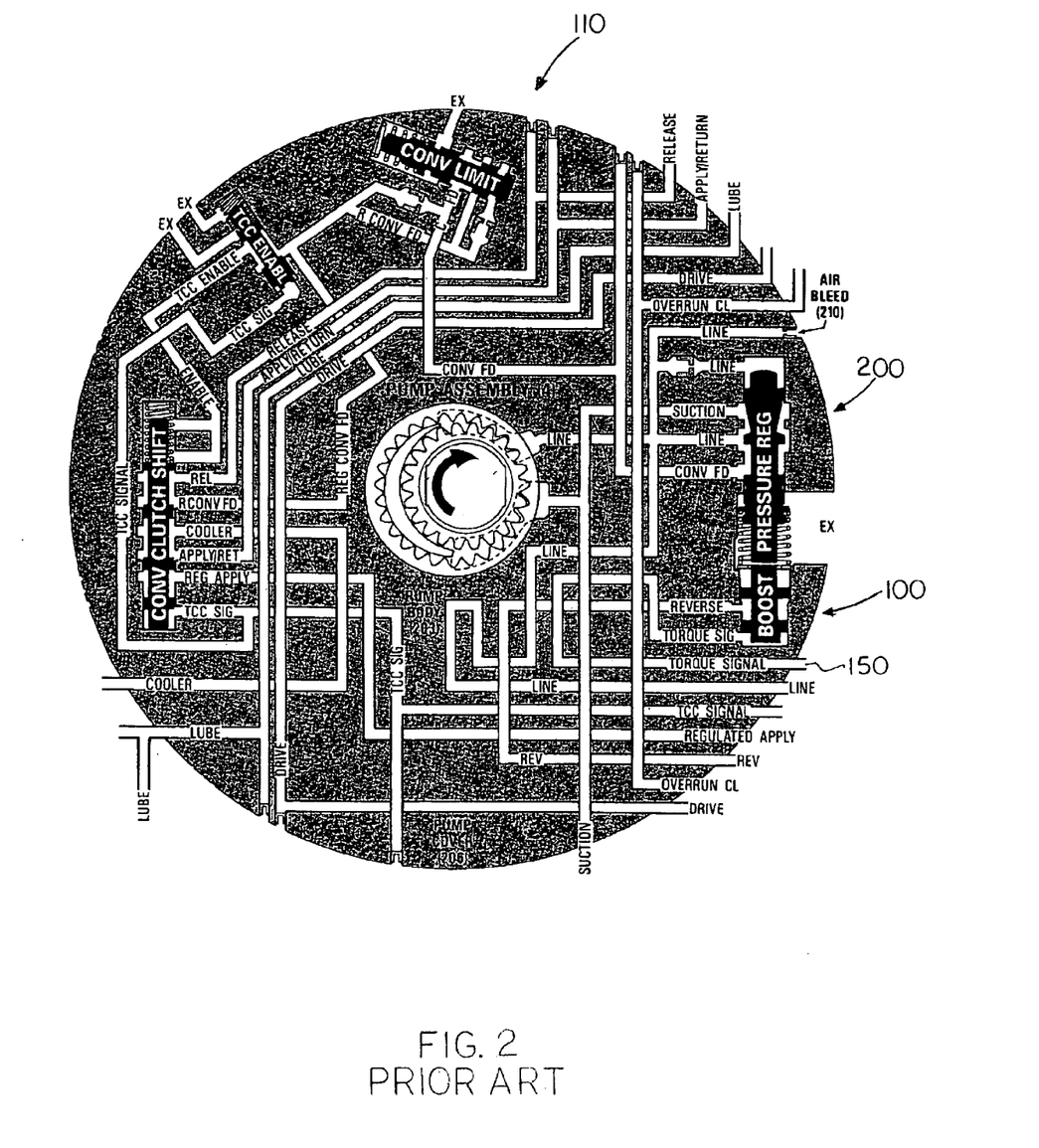
FIG. 2 is a schematic drawing of the hydraulic fluid circuits within the oil pump of the GM 4L80E transmission labeled Prior Art and showing the location of the Reverse Boost Valve.
Figure 3:
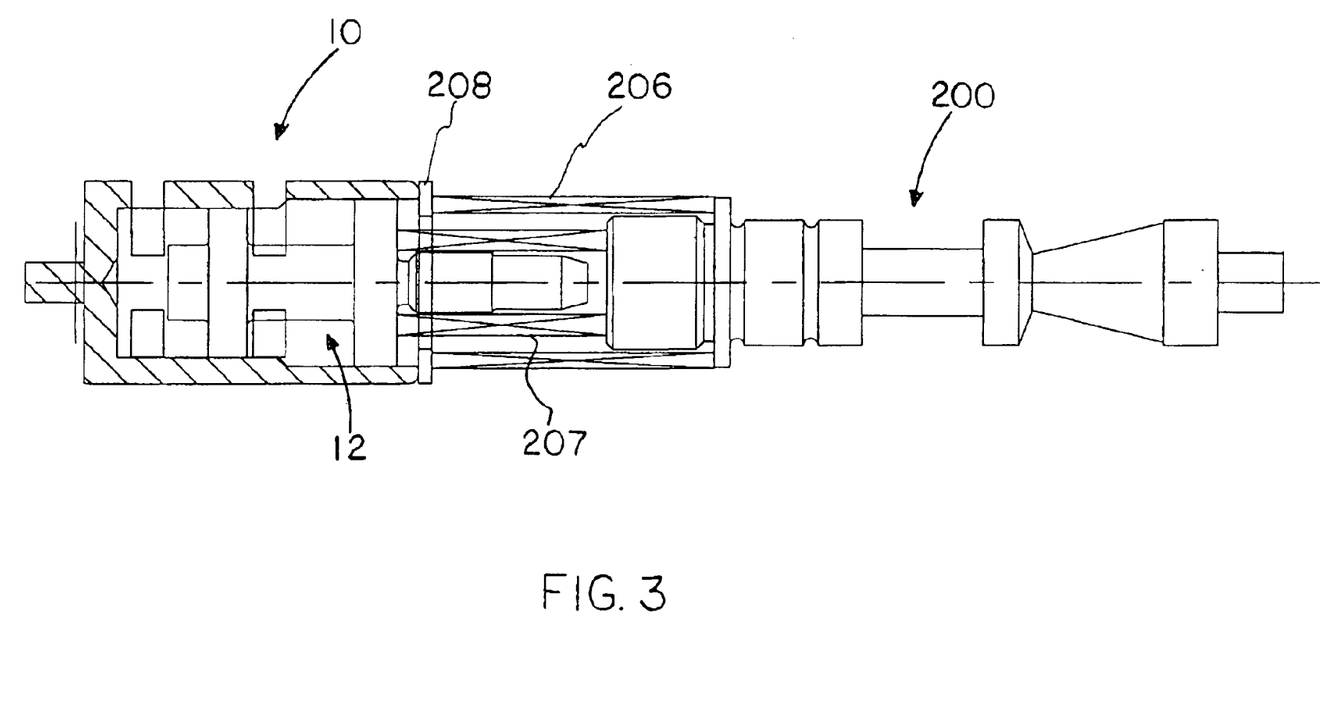
FIG. 3 is an elevational view of the present Self-Regulating Reverse Boost Valve Assembly shown in its functional position with the OEM Pressure Regulator Valve.

Referring now to FIG. 3 there is shown therein a Self-Regulating Reverse Boost Valve Assembly in accordance with the present invention, indicated generally at 10. The present Reverse Boost Valve Assembly 10 is illustrated in its functional position in relation to the Pressure Regulator Valve 200. As more clearly shown in FIG. 4A, the Reverse Boost Valve Assembly 10 is comprised of a Reverse Boost Valve piston subassembly, indicated generally at 12, and a Reverse Boost valve sleeve, indicated generally at 14, being arranged for installation within the pump 110 (FIG. 2) as a direct OEM replacement.

Figure 4A:
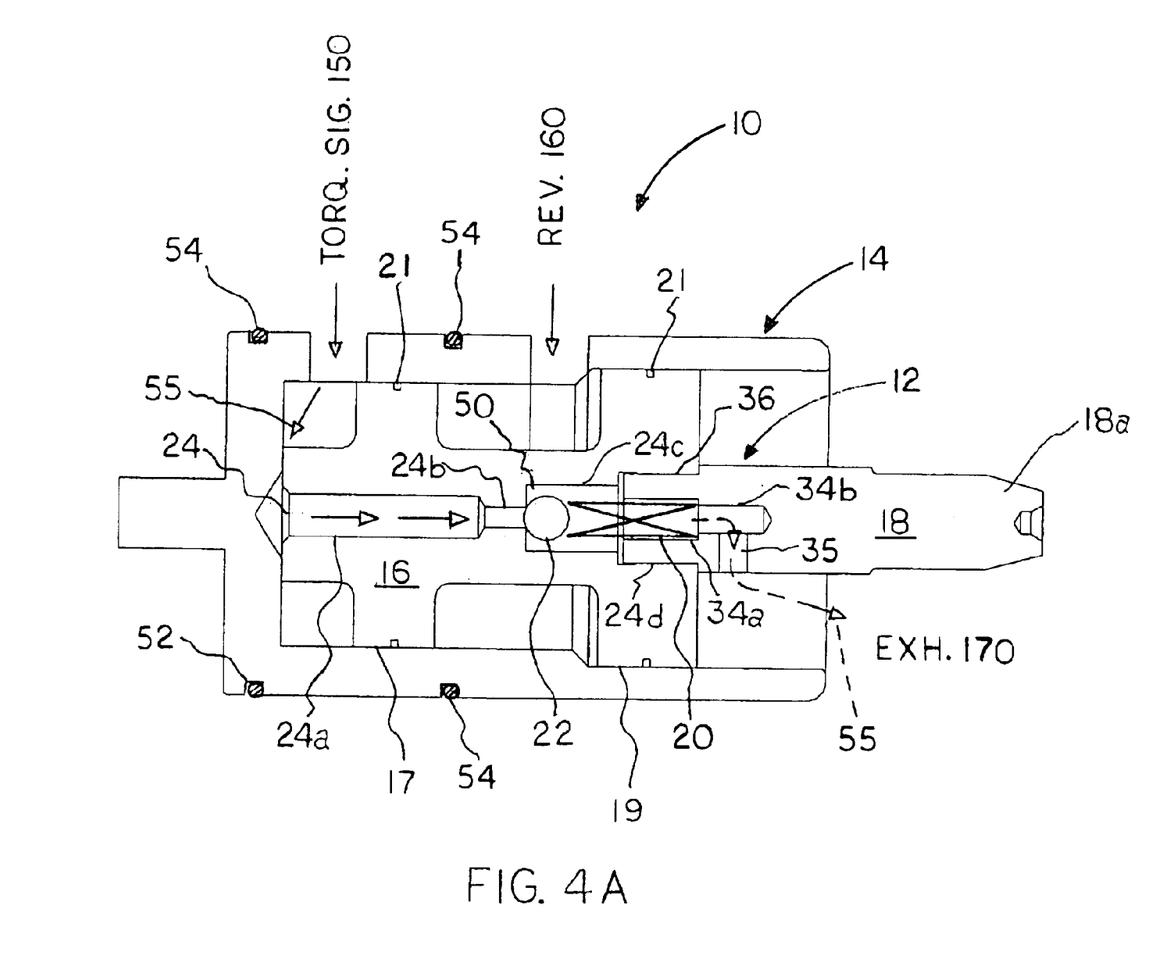
FIG. 4A is a cross-sectional view of the Self-Regulating Reverse Boost Valve Assembly of the present invention showing the details of the construction thereof.

In one embodiment the Reverse Boost piston subassembly 12 is comprised of a valve piston 16, a snout member 18, a compression spring 20, and a check ball 22 assembled as shown in FIG. 4A. Both the valve piston 16 and the snout member 18 are fabricated from low carbon steel and hardened in accordance with engineering specifications to reduce wear and increase longevity.

As shown in FIG. 4A the Reverse Boost valve piston 16 includes control lands 17, 19 integrally formed thereon, which serve to control the flow of ATF through the valve assembly 10. In the present invention the control lands 17, 19 have been widened in comparison to the OEM design to prevent cross-leakage and to add stability to the piston 16 within the sleeve 14.

In the embodiment shown in FIG. 4A, each control land 17, 19 includes at least one annular groove 21 formed therein to a predetermined depth. Annular grooves 21 function to distribute pressure across the circumference of lands 17, 19 by filling with ATF during operation thereby centering and supporting the valve piston 16 within the sleeve 14 to prevent side loading (i.e. lateral movement) substantially reducing friction and wear.

The Reverse Boost valve piston 16 includes an internal fluid channel 24 having multiple counterbored diameters 24a, 24b, 24c, and 24d, which extend along its axial length in fluid communication. The check ball 22 resides in the counterbore 24c defining a valve chamber 50 wherein an indented ball seat (not shown) is formed at the juncture of counterbores 24b, 24c. The counterbore 24d includes an internal thread (not shown) for mating engagement with an external thread as at 36, which are formed on the snout member 18.

The snout member 18 is an elongated cylindrical construction having a tapered tip portion 18a, which provides a contact surface for applying force to the Pressure Regulator valve 200. Snout member 18 also includes an internal fluid channel defined by counterbored diameters 34a, 34b, which interconnect with an exhaust passage 35 also in fluid communication with channel 24 of Reverse Boost valve piston 16. It can be seen that the juncture of counterbores 34a, 34b provides a seating surface for compression spring 20, which is permanently captured in functional alignment with the check ball 22 in the completed assembly as shown in FIG. 4A.

In the embodiment shown in FIG. 4A, check ball 22 is fabricated from a synthetic polymer material such as Torlon® polyamide-imide or other suitable polymer material having exceptional mechanical properties for wear resistance and heat resistance. In this embodiment check ball 22 is dimensioned to Ø0.125 to conform to the indented ball seat described hereinabove.

Figure 4B:
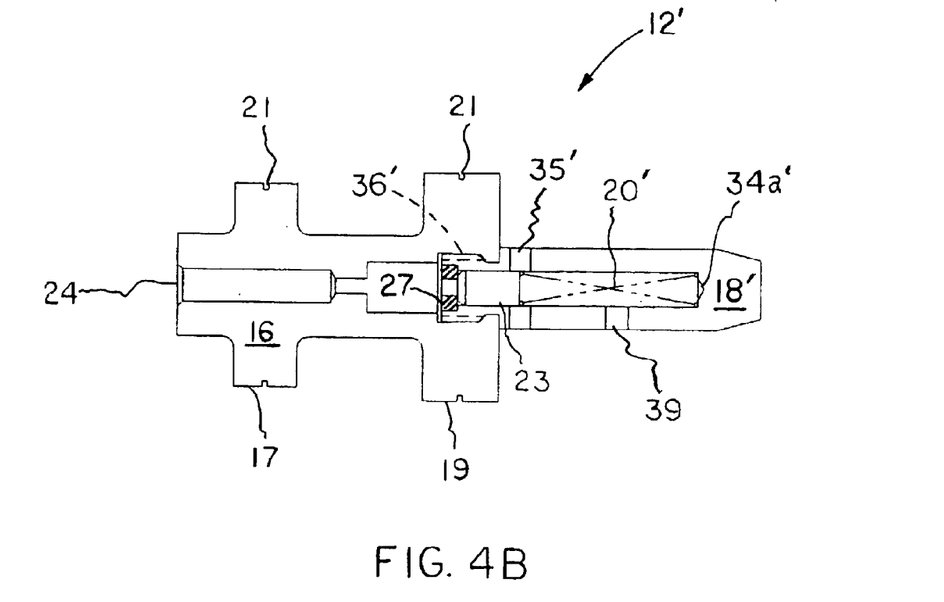
FIG. 4B is a cross-sectional view of another embodiment of the present Reverse Boost Valve Piston subassembly showing an alternative construction of the internal check valve.

In an alternative embodiment the piston assembly 12' is comprised of a valve piston 16, a modified snout member 18', a compression spring 20', a dowel pin 23, and a plug orifice 27 assembled as shown in FIG. 4B.

The modified snout member 18' provides structures comprising valve anti-locking means including, but not limited to, the following structures. It can be seen in FIG. 4B that the modified snout member 18' includes a fluid drain hole 39 that prevents any accumulation of ATF within the blind end 34a' of bore 34' wherein spring 20' resides, which could otherwise create resistance to the movement of the dowel pin 23 in operation causing so called fluid lockup of the check valve mechanism.

Snout member 18' is also provided with external threads 36', which engage mating internal threads (not shown) formed within the counterbore 24d of the valve piston 16 to secure the snout member 18' in the position shown.

Dowel pin 23 is fabricated of hardened alloy steel or other suitable material to predetermined dimensions to provide a slip fit in the modified valve chamber 34' wherein it resides. Spring 20' has a calibrated spring rate in the range of 95–105 psi.

Figure 5A:
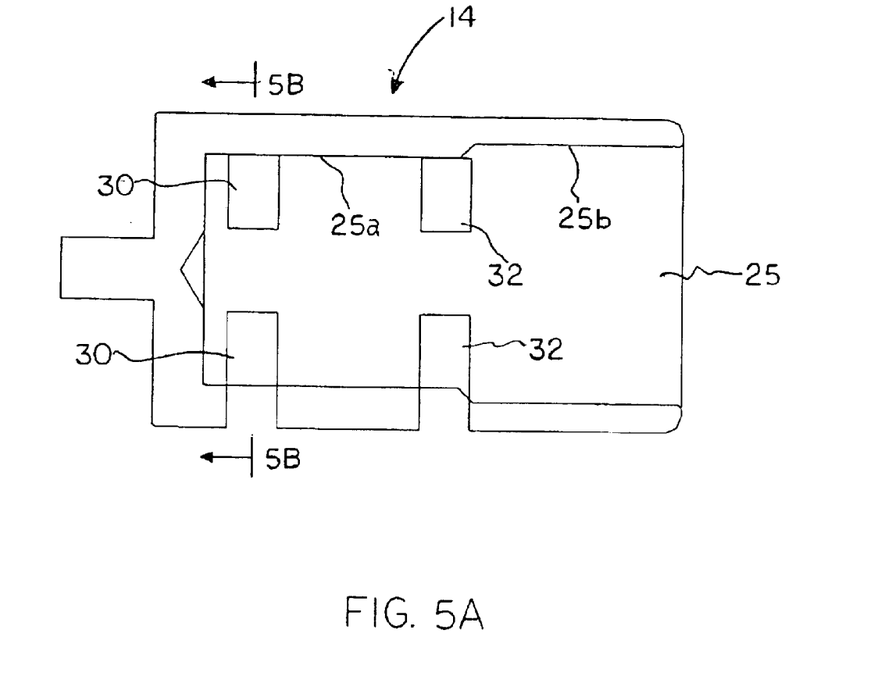
FIG. 5A is a cross-sectional view of the Reverse Boost Valve sleeve of the present invention.
Figure 5B:
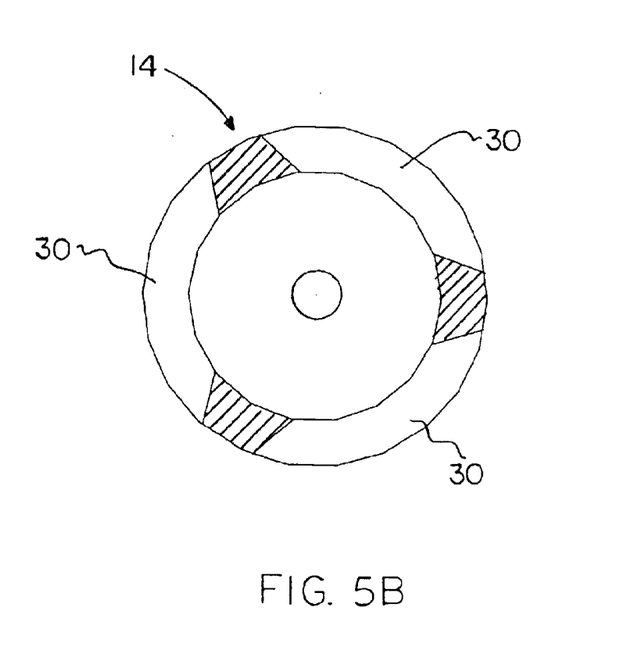
FIG. 5B is a cross-sectional view of the Reverse Boost valve sleeve taken along the section line 5B—5B of FIG. 5A.

Referring to FIG. 5A the Reverse Boost sleeve 14 is a generally cylindrical construction fabricated from steel material and hardened to engineering specifications. Sleeve 14 includes an internal bore 25, which is closed at one end. Counterbores 25a and 25b are dimensioned to provide a close tolerance fit with control lands 17, 19 of Reverse Boost valve piston 12. It can be seen that sleeve 14 is provided with a plurality of ports 30, 32 formed in predetermined locations for the entry/exit of ATF during operation. It will be noted that ports 30, 32 are positioned in fluid communication with the Torque Signal fluid circuit 150 and the Reverse fluid circuit 160 respectively within pump 110 when installation is complete.

In the embodiment shown sleeve 14 is provided with annular grooves 52 which receive O-ring seals 54 therein. O-ring seals 54 function to prevent fluid leakage around the sleeve 14 and cross-leakage between the torque signal fluid circuit 150 and the reverse boost circuit 160, which results in loss of torque signal fluid pressure and excessive reverse boost fluid pressure.

It will be appreciated that the present Self-Regulating Reverse Boost Valve 10 provides structures comprising pressure reducing means including, but not limited to, the following structures. Referring to FIG. 4A, the internal channel 24 within the Reverse Boost valve piston 12 permits the entry of Torque Signal (TS) fluid pressure as at 150 during normal Drive operation, which flows to check ball 22 as shown by directional arrows. Compression spring 20 is calibrated to stop the flow of TS fluid pressure past check ball 22 up to approximately 95 psi. Whenever TS pressure exceeds 95 psi, the check ball 22 is deflected (i.e. to the right in FIG. 4A) against the pressure of spring 20 and the excess TS fluid pressure is diverted via exhaust passage 35 in the snout member 18 to exhaust as at 170 as indicated by directional arrows 55.

In the embodiment shown in FIGS. 4B–4C, whenever TS pressure exceeds 95 psi, the dowel pin 23 is deflected to the right against the pressure of spring 20' and the increased TS fluid pressure is diverted via exhaust passage 35' in the snout member 18' in the manner described hereinabove.

In the Reverse gear range, reverse fluid is directed between the lands 17, 19 on the Reverse Boost valve piston 12 to move it toward the Pressure Regulator Valve 200. This increases line pressure to satisfy the additional torque requirements of Reverse gear.

Figure 6:
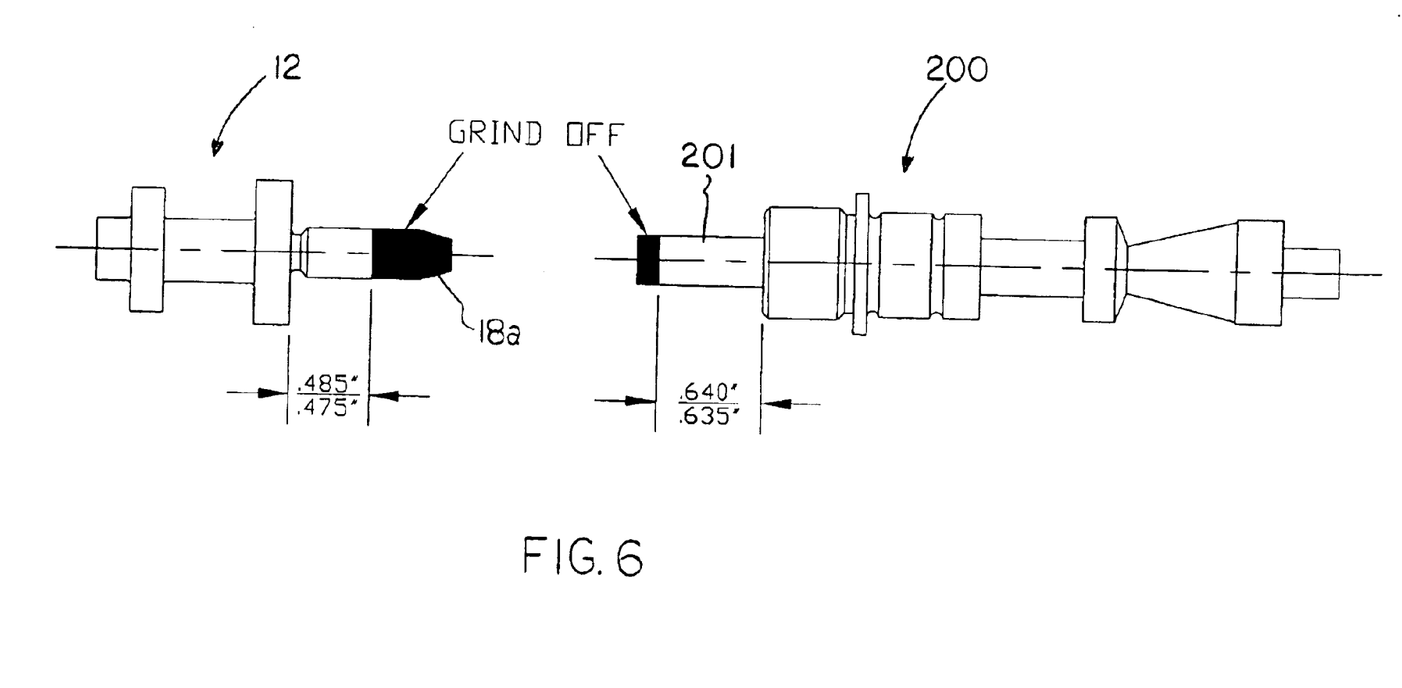
FIG. 6 is an elevational view of the present Reverse Boost Valve and the OEM Pressure Regulator Valve illustrating an alteration procedure to adapt the valves to 1989–1991 General Motors transmissions.

It will be noted that between 1989 and 1991, the OEM Pressure Regulator Valve 200 and Reverse Boost Valve 100 of the GM 4L80E transmission utilized a slightly different design than is disclosed herein. In that period the OEM Pressure Regulator Valve 200 was longer in length and the OEM Reverse Boost Valve 100 was shorter in length. The present Self-Regulating Reverse Boost Valve 10 can be retrofit for use in such 1989–1991 4L80E transmissions by alteration of the present Reverse Boost Valve 10 and the OEM Pressure Regulator Valve 200 respectively as illustrated in FIG. 6. In such a retrofit procedure, the service technician shortens the respective valve components to the lengths specified by grinding to adapt the present Reverse Boost Valve 10 to the 1989–1991 versions of the 4L80E transmission.

Figure 4C:
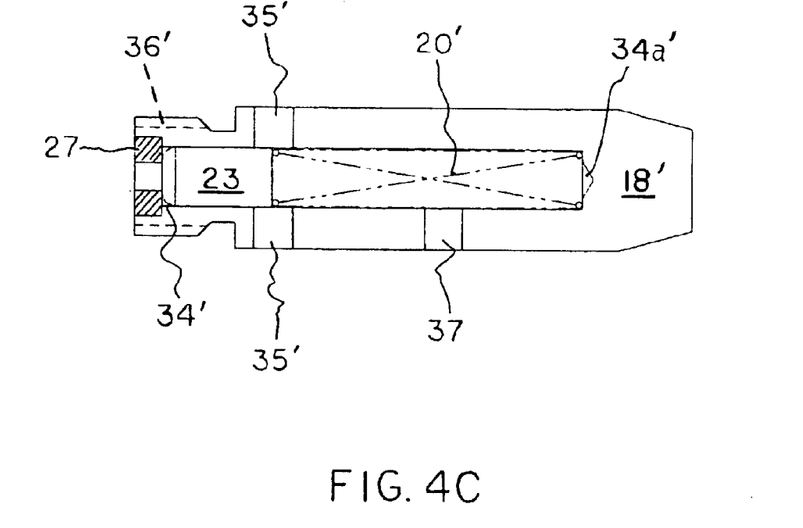
FIG. 4C is an enlarged cross-sectional view of the snout member shown in FIG. 4B wherein the internal check valve is contained.

It can be seen that the embodiment illustrated in FIGS. 4B–4C is not suitable for this modification due to a lack of necessary grinding stock. However, additional grinding stock may be removed from the stem portion 201 of the OEM Pressure Regulator Valve 200 to adjust the overall length of the combined valves 10, 200 to permit use of the embodiment shown in FIGS. 4B–4C Although not specifically illustrated in the drawings, it should be understood that additional equipment and structural components will be provided as necessary and that all of the components described above are arranged and supported in an appropriate fashion to form a complete and operative Self-Regulating Reverse Boost Valve incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A self-regulating reverse boost valve assembly for use in combination with a pressure regulator valve within a hydraulic pump of an automatic transmission, said reverse boost valve functioning to boost line pressure during high load conditions in response to torque signal fluid circuit pressure, said reverse boost valve assembly comprising:

a valve sleeve having at least one fluid channel in communication with the torque signal fluid circuit; and a reverse boost valve piston subassembly including a detachable snout member including a valve chamber in fluid communication with the torque signal fluid circuit, said valve piston, subassembly further including pressure reducing means disposed within said valve chamber operating to divert torque signal fluid pressure in excess of a predetermined level to the transmission sump.

2. The reverse boost valve assembly of claim 1 wherein said pressure reducing means comprises an internal check valve mechanism contained within said valve chamber in fluid communication with said torque signal fluid circuit.

3. The reverse boost valve assembly of claim 1 wherein said internal check valve mechanism comprises a check ball biased by a compression spring to a closed position in relation to the torque signal fluid pressure circuit, said check ball opening responsive to torque signal fluid pressure in excess of 95 pounds per square inch to divert said torque signal fluid pressure to an exhaust circuit.

4. The reverse boost valve assembly of claim 3 wherein said check ball is fabricated from a polymer material having exceptional characteristics for wear resistance and heat resistance.

5. The reverse boost valve assembly of claim 1 wherein said internal check valve mechanism comprises a cylindrical pin biased by a compression spring to a closed position in relation to the torque signal fluid pressure circuit, said cylindrical pin opening responsive to torque signal fluid pressure in excess of 95 pounds per square inch to divert said torque signal fluid pressure to an exhaust circuit.

6. The reverse boost valve assembly of claim 5 wherein said internal check valve mechanism includes a calibrated plug orifice installed therein that functions as a seat for said cylindrical pin to control the release of torque signal fluid pressure to exhaust.

7. The reverse boost valve assembly of claim 5 wherein said snout member includes valve anti-locking means to prevent fluid lockup of said internal check valve mechanism.

8. The reverse boost valve assembly of claim 7 wherein said valve anti-locking means comprises a transmission fluid drain hole in fluid communication with the blind end of said valve chamber to prevent accumulation of transmission fluid therein.

9. The reverse boost valve assembly of claim 1 wherein said valve sleeve includes a plurality of O-ring seals installed on the external surface thereof to prevent cross-leakage between torque signal fluid circuit and the reverse boost circuit.

10. An improved self-regulating reverse boost valve assembly for use in combination with a pressure regulator valve within the hydraulic pump of an automatic transmission, said reverse boost valve including a valve piston subassembly disposed within a mating valve sleeve in end-to-end relation with the pressure regulator valve, said reverse boost valve functioning to boost line pressure during high load conditions in response to torque signal fluid pressure, wherein the improvement comprises:

pressure reducing means including an internal check valve mechanism installed within said valve piston subassembly in fluid communication with the torque signal fluid circuit, said internal check valve mechanism being responsive to increases in said torque signal fluid pressure above a predetermined level and functioning to divert said torque signal fluid pressure to an exhaust circuit.

11. The reverse boost valve of claim 10 wherein said internal check valve mechanism comprises a check ball biased by a compression spring to a closed position in relation to the torque signal fluid circuit, said check ball opening responsive to torque signal fluid circuit pressure in excess of 95 pounds per square inch to divert torque signal fluid to exhaust.

12. The reverse boost valve of claim 11 wherein said check ball is fabricated from a polymer material having exceptional characteristics for wear resistance and heat resistance.

13. The reverse boost valve of claim 10 wherein said internal check valve mechanism comprises a cylindrical pin biased by a compression spring to a closed position in relation to the torque signal fluid circuit, said cylindrical pin opening responsive to torque signal fluid pressure in excess of 95 pounds per square inch to divert said torque signal fluid pressure to an exhaust circuit.

14. The reverse boost valve of claim 13 wherein said internal check valve mechanism includes a calibrated plug orifice installed therein that functions as a seat for said cylindrical pin.

15. A method of regulating line pressure generated within a hydraulic pump of an automatic transmission wherein such line pressure is controlled by a pressure regulator valve responsive to torque signal fluid circuit pressure applied to a reverse boost valve and, in turn, applied to the pressure regulator valve, said method comprising the steps of:

removing the original equipment manufacture reverse boost valve from the hydraulic pump of the transmission;

installing a self-regulating reverse boost valve assembly including a pressure reducing mechanism contained therein; and diverting hydraulic pressure received from the torque signal fluid circuit via the pressure reducing mechanism to the transmission sump responsive to hydraulic pressure in excess of a predetermined level.

16. The method of claim 15 wherein the step of diverting is carried out by an internal check valve comprising a check ball biased by a compression spring to a closed position in relation to the torque signal fluid circuit.

17. The method of claim 15 wherein the step of diverting is carried out by an internal check valve comprising a cylindrical dowel pin biased by a compression spring to a closed position in relation to the torque signal fluid circuit.

* * * * *